United States Patent [19]

Klös-Hein et al.

[11] Patent Number: 4,932,605

[45] Date of Patent: Jun. 12, 1990

[54] SWITCHING DEVICE IN A MAGNETIC-TAPE APPARATUS OF THE AUTO-REVERSE TYPE

[75] Inventors: Karl Klös-Hein, Wismar; Horst H. Rumpf, Herbörn-Schonbach, both of Fed. Rep. of Germany

[73] Assignee: U.S. Philips Corporation, New York, N.Y.

[21] Appl. No.: 403,044

[22] Filed: Aug. 31, 1989

Related U.S. Application Data

[63] Continuation of Ser. No. 189,271, May 2, 1988, abandoned.

[30] Foreign Application Priority Data

May 2, 1987 [DE] Fed. Rep. of Germany ....... 3714705

[51] Int. Cl.$^5$ ..................... G11B 15/44; G11B 15/28
[52] U.S. Cl. ................................. 242/201; 242/206; 242/208; 360/74.2; 360/96.4
[58] Field of Search ............. 242/201, 206, 208, 200; 360/74.1, 74.2, 96.3, 96.4

[56] References Cited

U.S. PATENT DOCUMENTS 4,434,442  2/1984  Kommoss et al. ............... 360/74.2
4,736,905  4/1988  Kido ............................... 360/96.3 X Primary Examiner—John M. Jillions
Attorney, Agent, or Firm—Brian J. Wieghaus

[57] ABSTRACT

The invention relates to a switching device in a magnetic-tape apparatus of the auto-reverse type, comprising a pivotal drive mechanism which is pivotable between two turntables to drive a first turntable in a first position and a second turntable in a second position. The pivotal drive mechanism, when it is pivoted between its first position and its second position in the case of a reversal of the direction of tape transport, actuates a change-over device for a pair of pressure rollers. The change-over device by means of a slide lifts a first or a second pressure roller journalled on a lever off an associated capstan against spring force. The pressure roller levers are pivoted about a pivotal axis by the pivotal drive mechanism and the slide via a first and a second cam lever respectively. The càm levers comprise cam surfaces which are followed by the pressure-roller levers. When the pivotal drive mechanism approaches the first or the second turntable, one of the cam levers is pivoted further via a pressure portion of the cam surface by the spring force acting on the associated pressure-roller lever, in such a way that the slide is urged into an end position by the pressure-roller lever. In the end position the pivotal drive mechanism is disengaged from the change-over device.

18 Claims, 5 Drawing Sheets

SWITCHING DEVICE IN A MAGNETIC-TAPE APPARATUS OF THE AUTO-REVERSE TYPE

This is a continuation of application Ser. No. 189,271, filed May 2, 1988, now abandoned.

BACKGROUND OF THE INVENTION

The invention relates to a switching device in a magnetic-tape apparatus of the auto-reverse type, comprising a drive mechanism which is pivotable between two turntables to drive a first turntable in a first position and a second turntable in a second position. The pivotal drive mechanism, when it is pivoted between its first and its second position in the case of a reversal of the direction of tape transport, actuates a change-over device for pressure rollers which device by means of a slide lifts a first or a second pressure roller journalled on a lever against an associated capstan against spring force.

A magnetic-tape apparatus of the type defined in the opening paragraph is described in EP-A1-47552 which corresponds to U.S. Pat. No. 4,434,442. This known magnetic-tape apparatus of the auto-reverse type comprises a pivotal drive mechanism for switching the drive from one turntable of the apparatus to the other turntable, for example, when the end of tape is reached. Simultaneously with the change-over of the drive from one turntable to the other the pressure rollers must be switched over in such a way that a pressure roller which is initially positioned against one capstan is lifted off this capstan and that another pressure roller is applied to another capstan. During the change-over from one turntable to the other turntable the pivotal drive mechanism can deliver the power needed for the change-over of the pressure rollers only in a specific central change-over range. This is because the turntables must couple correctly and the transmission of power must not be disturbed or loaded by other parts. This means that for changing over only a comparatively small part of the pivoting range of the pivotal drive mechanism is available. This, in its turn, complicates the disengagement of the pivotal drive mechanism from the pressure rollers. Therefore, the construction of the apparatus must be very accurate and is subject to close tolerances.

SUMMARY OF THE INVENTION

It is the object of the invention to provide a switching device as defined in the opening paragraph, in which the pressure rollers can be actuated over the entire pivoting range of the pivotal drive mechanism but which enables the change-over of the pressure rollers to be completed by parts which are independent of the pivotal drive mechanism.

According to the invention this object is achieved in that the pressure roller levers are pivoted about a pivotal axis by the pivotal drive mechanism and slide via a first and a second cam lever respectively. The cam levers comprise cam surfaces which are followed by the pressure-roller levers. When the pivotal drive mechanism approaches the first or the second turntable, one of the cam levers is pivoted further, by the spring force acting on the associated pressure-roller lever via a pressure portion of the cam surface, in such a way that the slide is urged into an end position by the pressure-roller lever. In the end position the pivotal drive mechanism is disengaged from the change-over device.

This construction has the advantage that the change-over of the pressure rollers is effected in the end range of the change-over by means of the spring load of the pressure-roller levers. Since the spring load is available anyway, this means that no additional parts for the change-over in the end range are needed. Thus, the pivotal drive mechanism is only involved in changing over the pressure rollers in its central range and in fact merely initiates the change-over of the pressure rollers. Changing over is effected and completed each time by one pressure-roller lever with the aid of one cam lever. The advantage of this construction is that in operation the pivotal drive mechanism is disengaged from the switching device or so that the pivotal drive mechanism alone can cooperate with the turntables.

In a further embodiment of the invention, the cam lever comprises a pin which interlocks with the slide, so that the cam lever is actuated by movements of the slide or the slide is actuated by movements of one of the pressure-roller levers via the associated cam lever. This means that the switching movement of the pressure rollers or the pressure-roller levers is always introduced by the slide and is subsequently taken over by the pressure-roller levers.

In a further embodiment of the invention, the cam surface comprises a sliding portion which is concentric with the pivotal axis and which adjoins the pressure portion, which is spaced at a smaller distance from the pivotal axis. These two different portions of the cam surface are necessary because always one of the pressure rollers is applied to a capstan and the other pressure roller must be lifted. The pressure roller which is lifted from its associated capstan is always kept in its lifted position via the sliding portion. The other pressure roller ensures that, via the pressure portion, the cam lever moves the slide into one of the end positions.

In another embodiment of the invention the slide comprises a fork and during actuation the fork tines are coupled to the pivotal drive mechanism until one of the pressure-roller levers begins to urge the slide towards one of its end positions at which the slide is disengaged from the pivotal drive mechanism. Thus, the pivotal drive mechanism acts always on the slide via one of the fork tines to move said slide in the desired switching direction. Since the further slide movement is taken over by a cam lever, the pivotal drive mechanism is then brought out of engagement with the fork tines.

In a further embodiment of the invention the slide comprises two slide sections which are movable relative to one another, a first slide section being adapted to cooperate with one pressure roller lever and a second slide section being adapted to cooperate with the other pressure roller lever, in that the first slide section is provided with a first armature plate and the second slide section with a second armature plate, and in that the slide sections are moved alternately into end positions by the pivotal drive mechanism, in which end positions the pressure rollers are disengaged from the associated capstans and in which the armature plates and hence the slide sections are retained electromagnetically. Once the two slide sections have been moved to their end positions the two pressure rollers can be lifted. In this way fast winding is possible. This can be achieved, for example, in that the electromagnet is a pulling magnet and is capable of attracting the armature plates to move the slide sections relative to one another.

In a modification of this embodiment the armature plates are retained by means of an electromagnet device comprising magnet coils and coil formers, the coil former being transversed by limbs of two U-shaped iron yokes, which limbs are magnetically isolated from one another and whose free ends function as polepieces; the iron yokes being arranged opposite one another in such a way that each time two polepieces are situated at the location of the two axial coil ends to cooperate with the first and the second armature plate respectively. This embodiment requires only one electromagnet to influence both armature plates and to move them in opposite directions. Such an arrangement provides a substantial saving of energy.

In a further embodiment of the invention the limbs of the iron yokes extend parallel to the slide sections. This results in a very efficient movement of the slide sections.

For lifting both pressure rollers, in a further embodiment of the invention, alternately one of the pressure rollers is lifted by one of the cam levers and the other pressure roller is lifted by one of the slide sections. Thus, in the final stages of the movement a combination is obtained between purely mechanical change-over of the pressure-rollers and electromagnetic lifting of the pressure rollers. Moreover, this embodiment enables the electromagnet to be constructed as a holding magnet, which reduces the current consumption and makes the magnet arrangement cheaper.

In another embodiment of the invention the slide and the slide sections are movable parallel to one another and are moved together by the pivotal drive mechanism via an actuating lever. Such a construction is compact, so that more space becomes available for other purposes or is saved to reduce the dimensions of the apparatus.

BRIEF DESCRIPTION OF THE DRAWINGS

Embodiments of the invention will now be described in more detail, by way of example, with reference to the accompanying drawings. In the drawings.

DESCRIPTION OF PREFERRED EMBODIMENTS

Figure 1:
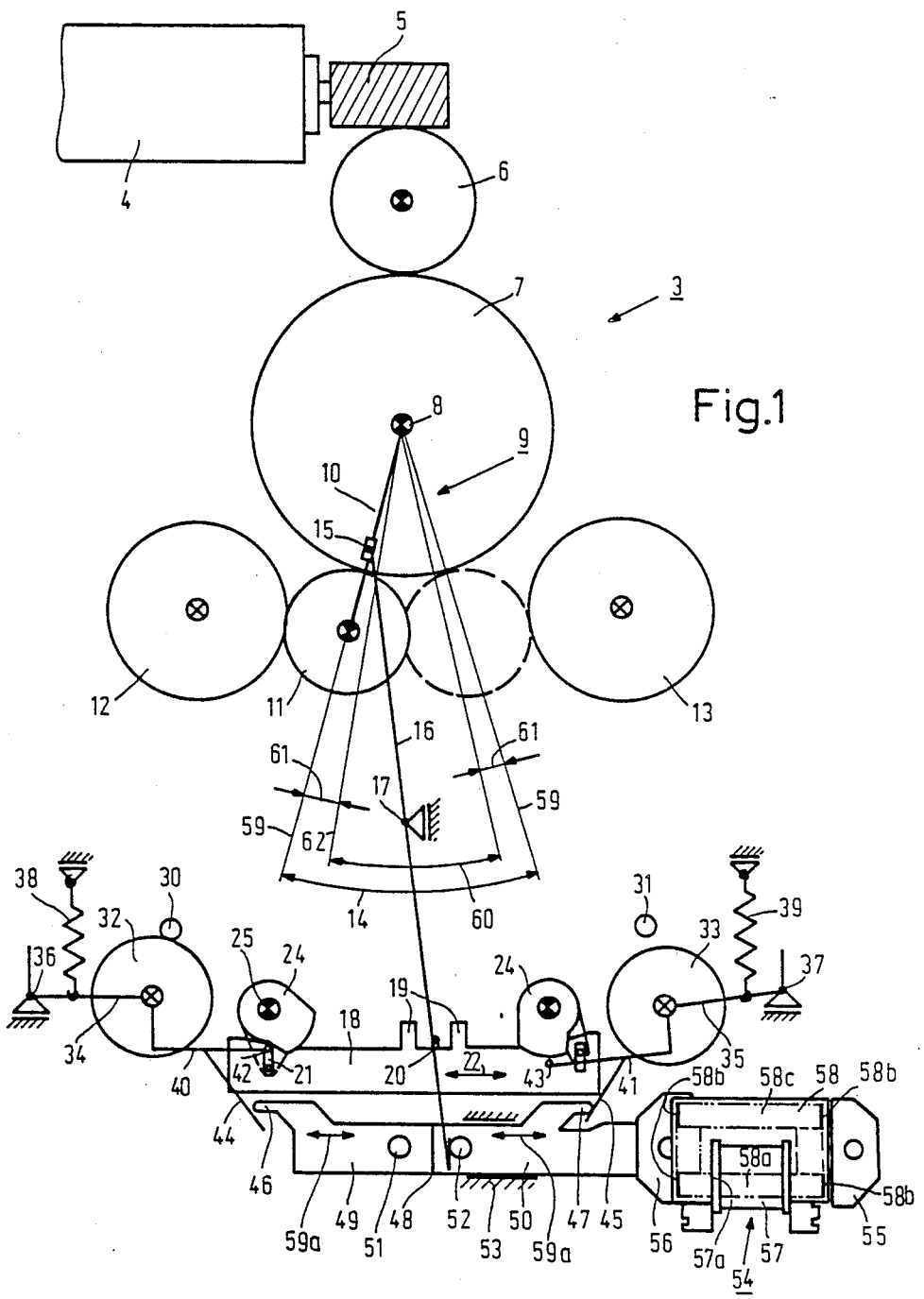
FIG. 1 shows a switching device in a magnetic-tape apparatus of the auto-reverse type, comprising a drive mechanism which is pivotable between two turntables and a change-over device for pressure rollers which are engageable with capstans.
Figure 3:
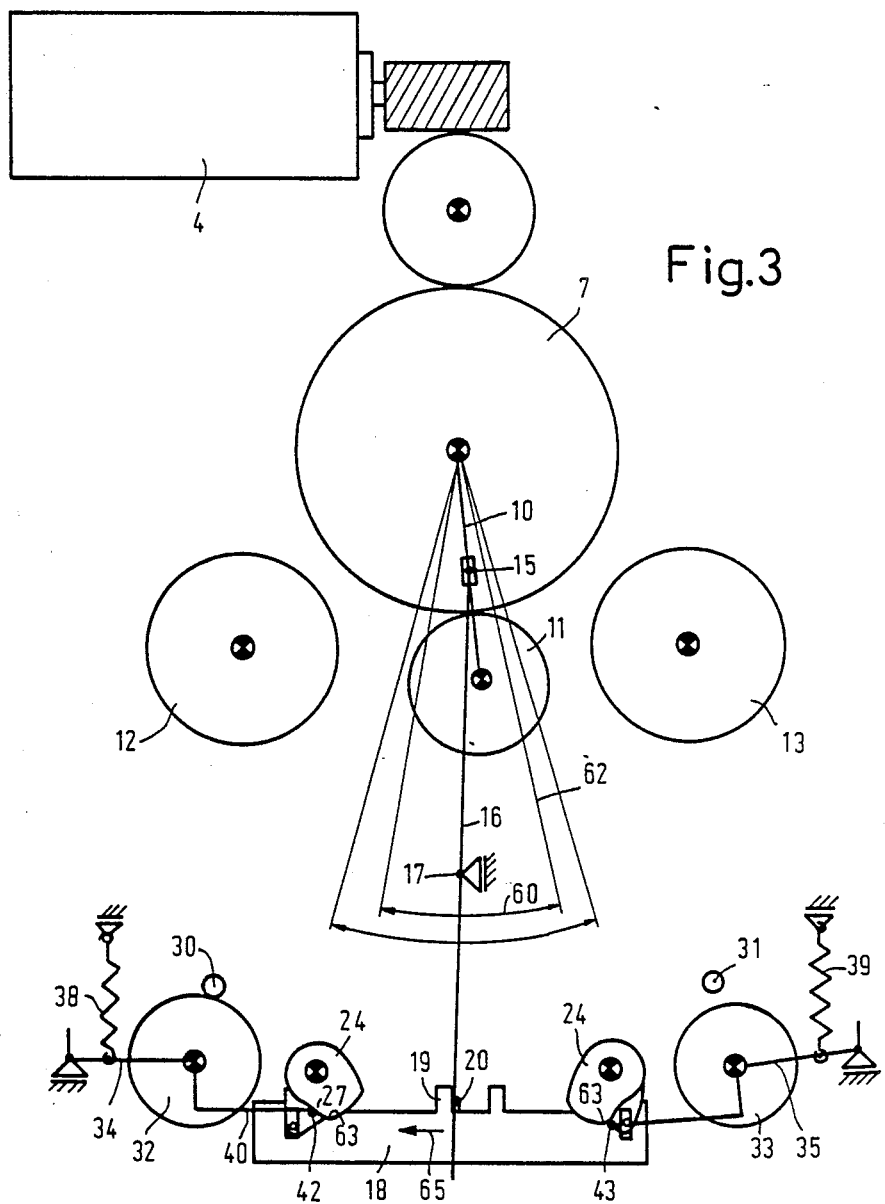
FIG. 3 shows the switching device during change-over of the pivotal drive mechanism.
Figure 4:
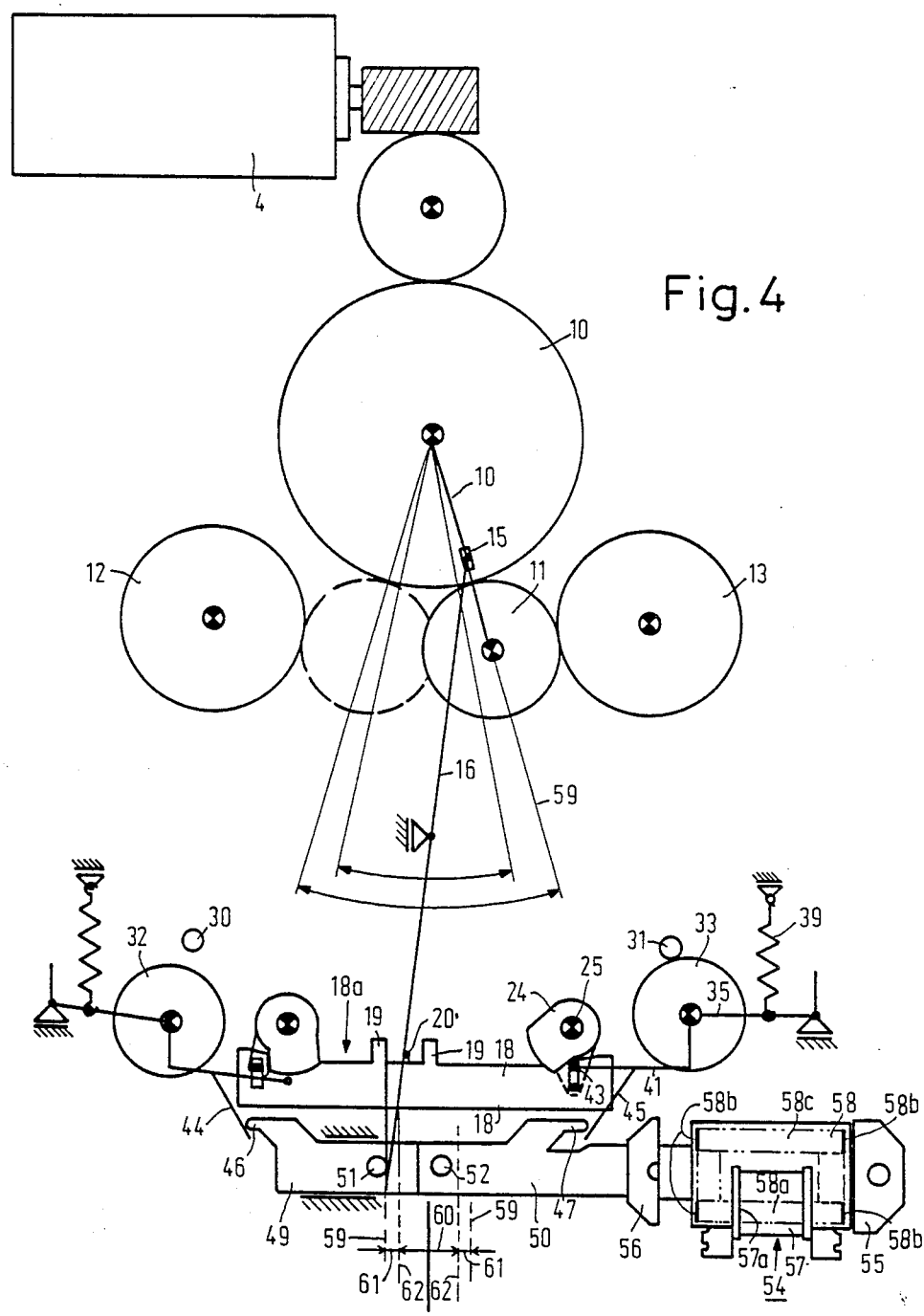
FIG. 4 shows the change-over device in an end position situated opposite the end position shown in FIG. 1.

FIGS. 1, 3 and 4 diagrammatically show a turntable drive 3 of a magnetic tape apparatus. The turntable drive 3 comprises a reversible motor 4, which drives a reduction gear wheel 6 via a worm shaft 5. The reduction gear wheel 6 is in mesh with a central gear wheel 7. A pivotal drive mechanism 9 is pivotable about the central shaft 8 of the central gear wheel 7 and comprises a pivotal arm 10 and a transmission gear wheel 11 mounted for rotation on said arm. The transmission gear wheel 11 can transmit rotations of the central gear wheel 7 to a first turntable wheel 12 or a second turntable wheel 13. For this purpose the transmission gear wheel 11 is movable in the directions indicated by a double arrow 14. The pivotal arm 10 is articulated to an actuating lever 16 via an articulation 15 and can pivot about a fulcrum 17.

A change-over device 18a comprises a slide 18 and fork tines 19 between which a coupling portion 20 of the actuating lever 16 engages. The slide has slots 21 which extend perpendicularly to the direction of movement on the slide 18 as indicated by the double arrow 22. The slots 21 are engaged by pins 23 of cam levers 24, which are pivotable about cam-lever pivots 25. Instead of slots 21 and pins 23 it is possible to use interengaging coupling elements of a different type, for example gear racks and gear segments. The cam levers 24 comprise a sliding portion 26 and a pressure portion 27, the pressure portion being situated at a smaller distance from the axis 28 of the cam-lever pivot 25.

The magnetic-tape apparatus comprises capstans 30, 31 by means of which a magnetic tape, not shown, can be moved past a magnetic head, not shown, when the pressure rollers 32, 33 are applied. The pressure rollers 32, 33 are mounted for rotation on pressure-roller levers 34, 35. The pressure-roller levers themselves are pivotable about fulcrums 36, 37 and tension springs 38, 39 tend to urge the pressure rollers 32, 33 against the associated capstans 30, 31. Each pressure-roller lever 34, 35 carries an arm 40, 41 with a follower 42, 43 to follow the cam surfaces formed by the sliding portions 26 and the pressure portions 27.

The arms 40 and 41 comprise actuating limbs 44, 45 which are adapted to cooperate with pins 46, 47 of a combined slide 48. The combined slide 48 comprises two slide sections 49, 50. The pin 46 forms part of the slide section 49 and the pin 47 forms part of the slide section 50. The slide section 49 has a stop 51 and the slide section 50 has a stop 52. Both slide sections 49 and 50 are guided in a common slide guide 53 and extend towards an electromagnet device 54. Near the electromagnet device 54 the slide section 49 carries an armature plate 55 and the slide section 50 carries an armature plate 56. In a coil former 54a the electromagnet device 54 carries a magnet coil 57. The magnet coil 57 is traversed by limbs 58a of a U-shaped iron yoke 58, which limbs are magnetically isolated from one another. The iron yokes 58 are arranged opposite one another in such a way that two pole pieces 58b are situated at the location of both axial coil ends 57a to cooperate with the armature plates 55 and 56 respectively. The limbs 58a, which extend through the coil 57, and the outer limbs 58c of the iron yoke 58 extend parallel to the slide sections 49, 50. The electromagnet device 54 is described comprehensively in German Patent Application P 3714704.8. The pole piece pairs 58 cooperate with the armature plates 55, 56. The two slide sections 49, 50 are movable parallel to the sliding direction 22 of the slide 18 in the direction indicated by a double arrow 59a.

It is to be noted that the total pivoting range of the pivotal drive mechanism 9, as is indicated by an arrow 14, is bounded by end positions 59. Between these end positions 59 there is a range indicated by a double arrow 60, in which range the pivotal drive mechanism is changed over by mechanical coupling either via friction or in force-sustained engagement via a gear wheel. In the end ranges 61 the force-sustained movement ceases and the transmission gear wheel 11 is pivoted by means of the slide 18 in a manner to be described hereinafter.

Figure 2:
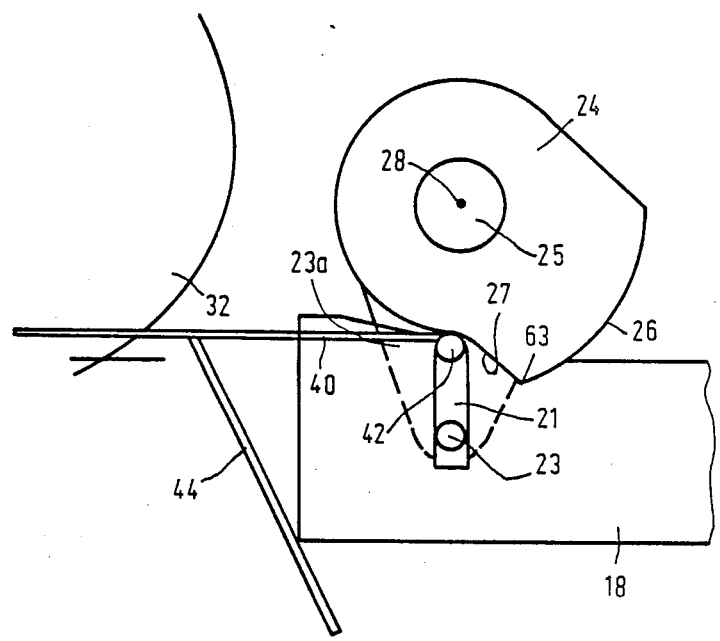
FIG. 2 shows a part of the change-over device of FIG. 1 to an enlarged scale.

It is assumed that in FIG. 1 the transmission gear wheel 11 has been pivoted towards the turntable wheel 12. This pivotal movement is obtained in that by means of the central gear wheel 7 the transmission gear wheel 11 is moved towards the turntable wheel 12 within the pivotal range 60 until the line 62 bounding this range 60 is reached. The direction of the pivotal movement depends on the direction of rotation of the motor. During this pivotal movement the coupling portion 20 abuts against the right-hand fork tine 19, thereby moving the slide 18 to the right. Before the line 62 is reached the follower 42 has already moved from the sliding portion 26 onto the pressure portion 27 of the cam lever 24. This is because the slide 18 moves the pin 23 to the right in the slot 21 and the follower 42, which previously followed the sliding portion 26, has now run onto the pressure portion 27 via a transition edge 63 (FIG. 2). The tension spring 38, which urges the follower 42 against the pressure portion 27, then exerts such a pressure on the cam lever 24 that it is pivoted anti-clockwise. This anti-clockwise pivotal movement of the cam lever 24 produced by the tension spring 38 ensures that the pin 23 of the cam lever 24 moves the slide 18 further to the right via the slot 21 until the transmission gear 11 has reached the end position 59 in a friction-dependent manner and the central gear wheel 7 thus drives the turntable wheel 12.

Since the slide 18 is moved from the end of the pivotal range 60 into one of its two end positions by the tension springs 38 and 39 via the cam lever 24 without intervention of the drive mechanism, the pivotal drive mechanism 9 is not coupled to the change-over device 18a if one of the pressure rollers 32, 33 is in engagement with the associated capstan 30, 31. Thus, in the playing modes the pivotal device mechanism is completely disengaged from and not loaded by the change-over device 18a.

FIG. 2 shows to an enlarged scale how the cam levers 24 cooperate with the slide 18 and the follower 42 of the arm 40. At the rear of the slide 18 the pin 23, which extends through the slot 21, is secured to a cam portion 23a which forms part of the cam lever 24, with which it is pivotable about the axis 28.

FIG. 3 shows how after a reversal of the direction of rotation of the motor 4 the central gear wheel 7 has disengaged the transmission gear wheel 11 from the turntable wheel 12 and moved it towards the other turntable wheel 13, the pivotal arm 10 being pivoted anti-clockwise. At the same time the pivotal arm 10 has pivoted the actuating lever 16 about the fulcrum 17 and the coupling portion 20 has abutted against the left-hand fork tine 19. The actuating lever 16 then moves the slide 18 to the left in the direction indicated by an arrow 65. This movement to the left of the slide 18 results in the follower 42 of the arm 40 moving over the pressure portion 27 towards the transition edge 63. Since the pivotal range of the pivotal arm 10 is situated within the force-sustained coupling range of the central gear wheel 7, the follower 42 overcomes the apparent inclination on the left-hand cam lever 24 opposed by the force of the tension spring 38. At the right-hand cam lever 24 the follower 43 has just reached the transition edge 63 and is about to run onto the pressure portion 27. Once the pressure portion 27 is reached, the pivotal drive mechanism with the pivotal arm 10 will shortly afterwards reach the end of the range of force-sustained coupling indicated by the line 62. When the force-sustained coupling between the central gear wheel 7 and the transmission gear wheel 11 has ceased, the tension spring 39 provides the continued pivotal movement of the pivotal arm 10 to the right, in that the follower 43 moves the slide 18 further to the left via the right-hand cam lever 24 until its end position 18a is reached, in which the transmission gear wheel 11 has reached the turntable wheel 13, to establish the force-sustained coupling between the central gear wheel 7 and the turntable 13 via the intermediate gear wheel 11.

This end position is shwon in FIG. 4. However, to illustrate the cooperation between the pressure rollers 32, 33 and the capstans 30, 31 reference is made to FIG. 3.

In FIG. 1 the pressure roller 32 is in engagement with the capstan 30 and the pressure roller 33 is disengaged from the capstan 31. Since the follower 42 has run onto the pressure portion 27 of the left-hand cam lever 24 towards the transition edge 63, the arm 40 tends to lift the pressure roller 32 off the capstan 30. In the situation illustrated in FIG. 3 pressure roller 32 is still in engagement with the associated capstan 30.

In the situation shown in FIG. 4 the pivotal arm 10 has reached its right-hand end position, indicated by the line 59. In this end position 59 the clearance of the coupling portion 20 of the actuating lever 16 relative to the fork tines 19 corresponds to the range 61. Under the influence of the tension spring 39 the arm 41 has pivoted the right-hand cam lever 24 so far clockwise via the follower 43 that the arm 41 is now situated closer to the cam-lever pivot. As a result of this, the spring 39 has applied the pressure roller 33 to the capstan 31 via the pressure-roller lever 35, which is pivoted clockwise. Now playing in the opposite direction can begin, because the capstan 31 and the pressure roller 33 can move the tape past the magnetic head, not shown, in a direction opposite to that illustrated in FIG. 1. In the position shown in FIG. 4 the pressure roller 32 is disengaged from the capstan 30.

In FIGS. 1 and 4 the slide sections 49, 50 and the electromagnet devices 54 are shown below the slide 18. In principle, the switching device cooperates with the electromagnet device 54 without the additional slide sections 49, 50. However, it is alternatively possible to dispense with the slide 18 with the cam levers 24 and to use only the slide sections 49, 50 and the electromagnet device 54.

If the slide 18 is dispensed with, it is assumed that the electromagnet device is constructed in such a way that it is capable of attracting the armature plates 55, 56 over a distance corresponding to the end ranges 61. When it is assumed that the pressure roller 32 engages with the capstan 30, the arm 40 has moved the slide section 49 so far to the right via the actuating limb 44 and the pin 46 that the armature plate 55 is situated far enough from its polepieces 58. The slide section 49 then cannot be moved to the left in the lifting direction by magnetic force alone. However, for the slide section 50 and the armature plate 56 the situation is different. The actuating lever 16 has moved the slide section 50 to the right via the stop 52 into the end range 62 of the coupled pivotal drive mechanism 9. As a result of this, the distance between the armature plate 56 and the associated polepieces 58b has decreased so far that the armature plate 56 can now be attracted, and the slide section 50 has electromagnetically covered the end range 61. The pin 47 has then withdrawn the pressure roller 33 from the capstan 31 via the actuating limb 45 and the arm 41.

FIG. 4 illustrates the opposite position. The slide section 50 has been moved so far to the left by the actuating limb 45 with the aid of the tension spring 39, that the attractive force of the polepieces 58b is no longer adequate to attract the armature plate 56. However, since the actuating lever 16 has abutted against the stop 51 it has moved the slide section 49 so far to the left that the armature plate 55 is now situated close enough to the associated polepieces 58b for said plate to be magnetically attracted against the right-hand polepieces 58b. The pin 46 has then lifted the pressure roller 32 off the capstan 30 via the actuating limb 44.

If the switching device is employed in a deck of a car ratio its heat dissipation must be minimal. In the switching device the heat dissipation can be reduced if the electromagnet device 54 is constructed as a holding magnet device. This means that the device is not actively involved in the actuation; in conjunction with the change-over device 18a with the slide 18 this additional device, comprising the slide sections 49, 50 and the electromagnet device 54, can then be used for lifting the two pressure rollers 32, 33 off the associated capstans 30 and 31. For this reference is made to FIG. 4, in which the pressure roller 32 is lifted and the armature plate 55 is positioned against the associated polepieces 58b. If the magnet coil 57 is energised at this instant, the armature plate 55 will stick to the polepieces 58b and the pin 46 will subsequently urge the pressure roller 32 away from the capstan 30 via the actuating limb 44.

Figure 5:
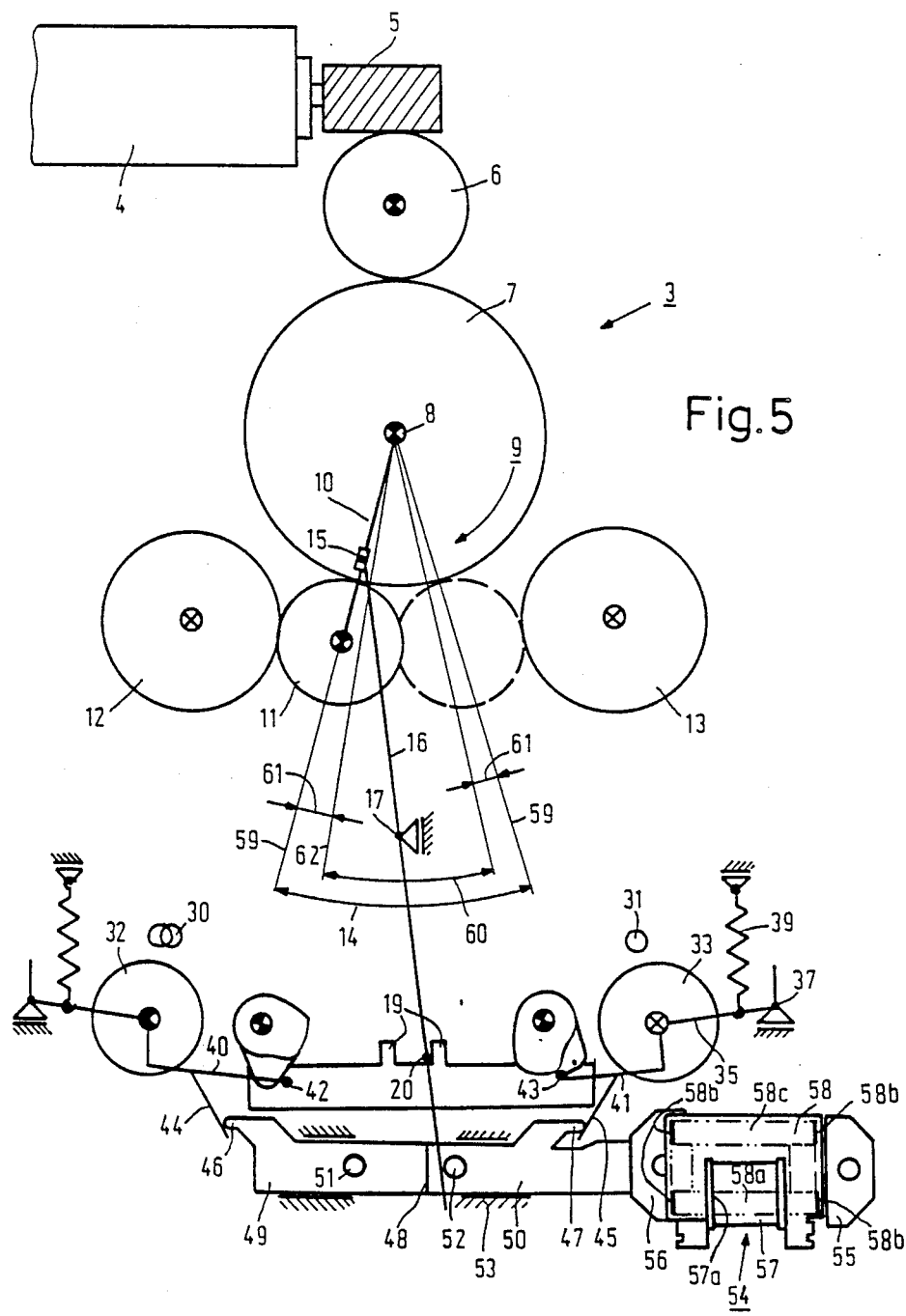
FIG. 5 shows the lower part of FIG. 1 while both pressure roller are lifted off the capstans.

If the pivotal arm 10 now pivots the transmission gear wheel 11 clockwise towards the turntable wheel 12 as a result of a reversal of the direction of rotation of the motor 4, the actuating lever 16 will be urged against the stop 52, as can be seen in FIG. 1, so that the slide section 50 is moved to the right and the armature plate 56 comes closer to the associated polepieces 58b. When it is close enough the armature plate 56 is positioned against the polepieces 58b, covering a distance 61, and the pressure roller 33 is lifted off the associated capstan 31 by the pin 47 via the actuating limb 45. This means that both pressure rollers 32, 33 are now clear of their associated capstans 30, 31. It is then possible to carry out, for example, fast winding. This position is illustrated in FIG. 5.

What is claimed is:

1. A switching device in a tape recorder of the auto-reverse type having first and second winding turntables for winding tape reels, a pair of capstans each driveable with a respective winding turntable for transport of tape in one direction or the opposite direction, and a pair of pressure rollers alternately engageable with a respective capstan for driving the tape in said one direction or the opposite direction, wherein said switching device comprises:

a driving mechanism pivotable between said two turntables for driving said first turntable in a first driving position of said driving mechanism and for driving said second turntable in a second driving position of said driving mechanism, between said first and second driving positions said pivotable driving mechanism defining a central pivotal range bounded by end ranges;

means for pivoting said driving mechanism from one driving position to the other driving position for driving the other turntable upon reversal of the direction of tape transport, during said pivoting said driving mechanism disengaging from one winding turntable and pivoting through a said end range, passing through said central pivotal range into the other end range, and engaging the other turntable at the other driving position for driving the other turntable;

first and second pressure-roller levers each having a pressure roller journalled thereon and pivotable about a respective pivotal axis, said pressure rollers being engaged with or disengaged from a respective capstan by selective pivoting of said pressure-roller levers between engaged and disengaged positions;

biasing means for pivoting each pressure-roller lever for urging each pressure roller against a respective capstan;

a control slide linearly translatable between first and second end positions for controlling engagement and disengagement of said pressure rollers with a respective capstan, said control slide being coupled to said driving mechanism for translating said control slide a predetermined distance towards the other end position during pivoting of said driving mechanism through said central pivotal region upon a reversal of direction of tape transport, said control slide being decoupled from said driving mechanism in said end ranges;

first means for allowing pivoting of one pressure-roller lever into said engaged position and for holding the other pressure-roller lever in said disengaged position for driving the tape in one direction when said control slide is disposed at one end position, and for alternating said positions of said pressure-roller levers for driving said tape in the opposite direction when said control slide is in the other end position;

second means responsive to said translation of said control slide during pivoting of said driving mechanism through said central pivotal range for pivoting said pressure-roller levers to selectively engage and disengage said pressure rollers from their respective capstans; and third means for completing translation of said control slide to the other end position upon decoupling of said control slide from said driving mechanism when said driving mechanism passes from said central pivotal range into said other end range.

2. A switching device as claimed in claim 1, wherein said device comprises first and second cams each followed by a respective pressure-roller lever, said first means comprising each cam having a first surface for holding a respective pressure-roller lever in said disengaged position when said control slide is at either of said end positions;

said second means comprises each cam having a pressure surface for pivoting a respective pressure-roller lever to said disengaged position upon translation of said control slide through said predetermined distance during pivoting of said driving mechanism through said central pivotal region; and said third means comprising said pressure-roller levers and said cam pressure surfaces being arranged such that the pressure-roller lever not pivoted to said disengaged position bears upon said pressure surface of its respective cam via said baising means to translate said control slide to the other end position after said decoupling of said control slide from said driving mechanism.

3. A switching device as claimed in claim 2, wherein each cam comprises a cam lever pivotable about a respective pivotal axis, and cam lever coupling means for coupling each cam lever to said control slide such that translation of said control slide pivots said cam levers and pivoting of said cam levers translates said control slide.

4. A switching device as claimed in claim 3, wherein said cam lever coupling means comprises each cam lever having an arm with a slide pin secured thereon and said control slide comprises a pair of slots each receiving a slide pin of a respective cam lever.

5. A switching device as claimed in claim 3, wherein said first cam surface comprises a sliding surface concentric with said pivotal axis, said cam surface adjoining said pressure surface and merging into said pressure surface at a transition edge of said cam.

6. A switching device as claimed in claim 5, further comprising said control slide having a pair of spaced stops, and a slidable coupling connected to said driving mechanism slidable on said control slide between said stops, said stops being arranged such that said coupling translates said control slide a sufficient distance so that said pressure-roller lever begins to urge the slide towards said other end position when said driving mechanism pivots through the boundary of said central pivotal range and said other end range.

7. A switching device as claimed in claim 2, further comprising said control slide having a pair of spaced stops, and a slidable coupling connected to said driving mechanism slidable on said control slide between said stops, said stops being arranged such that said coupling translates said control slide a sufficient distance so that said pressure-roller lever begins to urge the slide towards said other end position when said driving mechanism pivots through the boundary of said central pivotal range and said other end range.

8. A switching device as claimed in claim 1, further comprising each pressure-roller lever having an arm extending therefrom; and said control slide comprising first and second sections linearly translatable relative to each other, said first section being translatable into said first end position and said second section being translatable into said second end position by said driving mechanism, each section having a portion for cooperating with a said arm of a respective pressure-roller lever for pivoting said pressure-roller levers into said disengaged positions when said sections are disposed in their respective end positions; and electromagnetic holding means for electromagnetically holding each slide section in a respective end position, in said end positions each slide holding a respective pressure-roller lever in said disengaged position whereby neither pressure-roller lever is engaged with a respective capstan.

9. A switching device as claimed in claim 8, wherein said electromagnetic holding means comprises each slide section having an armature plate disposed thereon;

an axial magnetic coil having opposing ends, and coil formers; and a pair of U-shaped iron yokes each having two parallel limbs terminating at free ends, said parallel limbs of each yoke being magnetically isolated from each other such that said free ends function as pole pieces, said iron yokes being arranged opposite one another such that two pole pieces are located proximate each of said ends of said axial coil for holding a respective armature plate of said first and second slide sections.

10. A switching device as claimed in claim 9, wherein in that the limbs of the iron yokes extend parallel to the slide sections.

11. A switching device as claimed in claim 8, wherein said control slide comprises a first slide and a second slide which comprises said first and second relatively translatable sections, and said device further comprising first and second cams each followed by a respective pressure-roller lever, said first means comprising each cam having a first surface for holding a respective pressure-roller lever in said disengaged position when said first slide is at either of said end positions;

said second means comprises each cam having a pressure surface for pivoting a respective pressure-roller lever to said disengaged position upon translation of said first slide through said predetermined distance during pivoting of said driving mechanism through said central pivotal region; and said third means comprising said pressure-roller levers and said cam pressure surfaces being arranged such that the pressure-roller lever not pivoted to said disengaged position bears upon said pressure surface of its respective cam via said biasing means to translate said first slide to the other end position after said decoupling of said first slide from said driving mechanism.

12. A switching device as claimed in claim 11 wherein said electromagnetic holding means comprises means for drawing said slide sections into said end positions.

13. A switching device as claimed in claim 12, wherein in that, for lifting both pressure rollers alternately one of the pressure rollers is lifted by one of the cams by translation of said first slide to one end position and the other pressure roller is lifted by one of the slide sections of the second slide being attracted to and held in an opposite end position by said electromagnetic holding means.

14. A switching device as claimed in claim 13, wherein the first and second slides are movable parallel to one another, and an actuating lever coupled to said driving mechanism and said first and second slides move said first and second slides in unison.

15. A switching device as claimed in claim 11, wherein each cam comprises a cam lever pivotable about a respective pivotal axis, and cam lever coupling means for coupling each cam lever to said first slide such that translation of said first slide pivots said cam levers and pivoting of said cam levers translates said first slide.

16. A switching device as claimed in claim 15, wherein said cam lever coupling means comprises each cam lever having an arm with a slide pin secured thereon and said first slide comprises a pair of slots each receiving a slide pin of a respective cam lever.

17. A switching device as claimed in claim 15, wherein said first cam surface comprises a sliding surface concentric with said pivotal axis, said cam surface adjoining said pressure surface and merging into said pressure surface at a transition edge of said cam.

18. A switching device as claimed in claim 17, further comprising said first slide having a pair of spaced stops, and a slidable coupling connected to said driving mechanism slidable on said first slide between said stops, said stops being arranged such that said coupling translates said first slide a sufficient distance so that said pressure-roller lever begins to urge the first slide towards said other end position when said driving mechanism pivots through the boundary of said central pivotal range and said other end range.

* * * * *